June 20, 1967  G. C. KOTHMANN  3,326,576
UNIVERSAL HITCH FOR EMERGENCY DRAWBAR
Filed Sept. 10, 1965  3 Sheets-Sheet 1
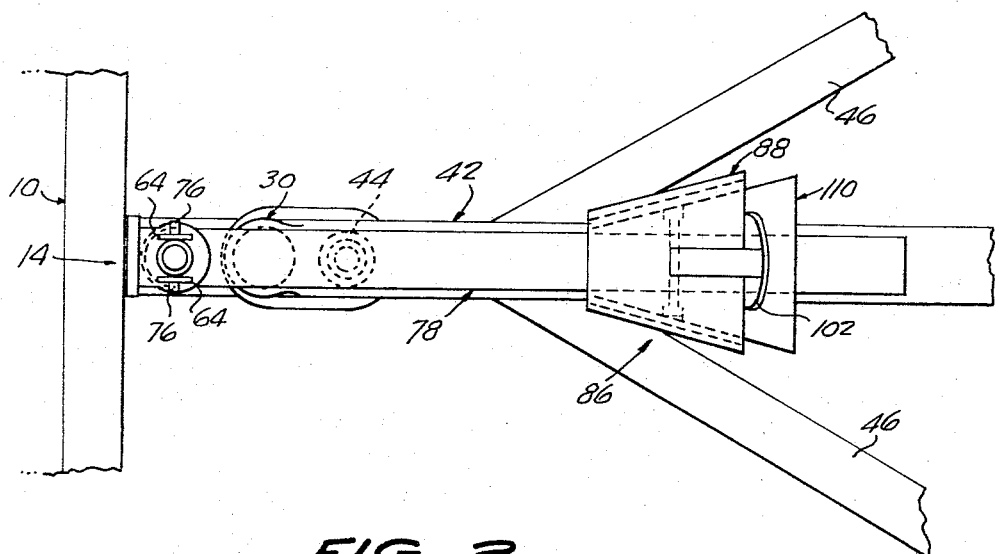
FIG. 1.
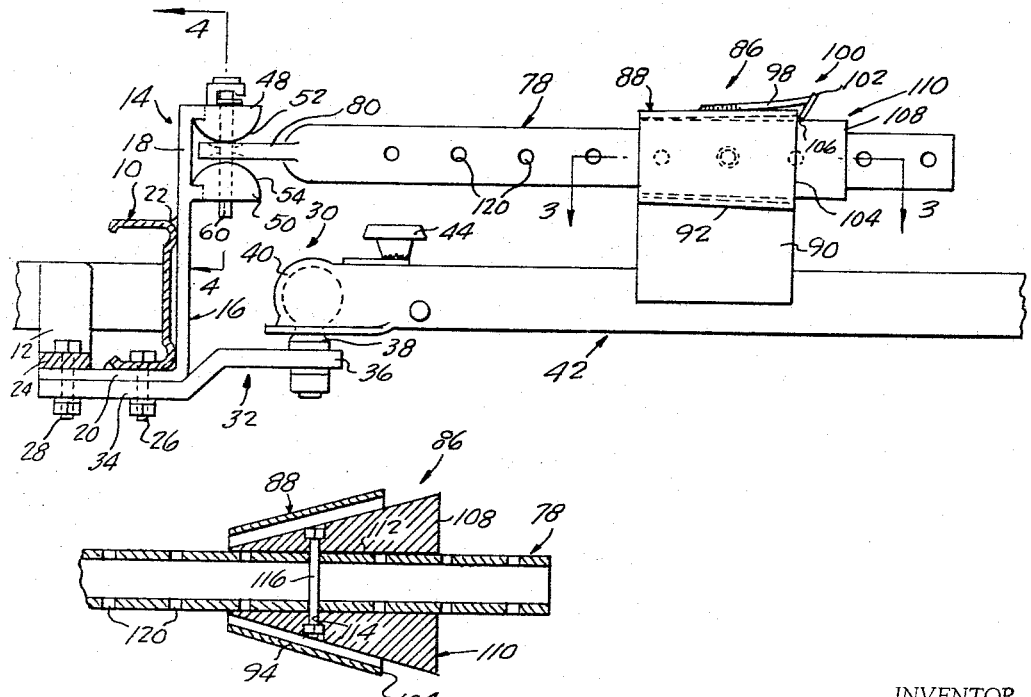
FIG. 2.
FIG. 3.
INVENTOR.
GILBERT KOTHMANN,
BY
Berman, Davidson & Berman
ATTORNEYS.

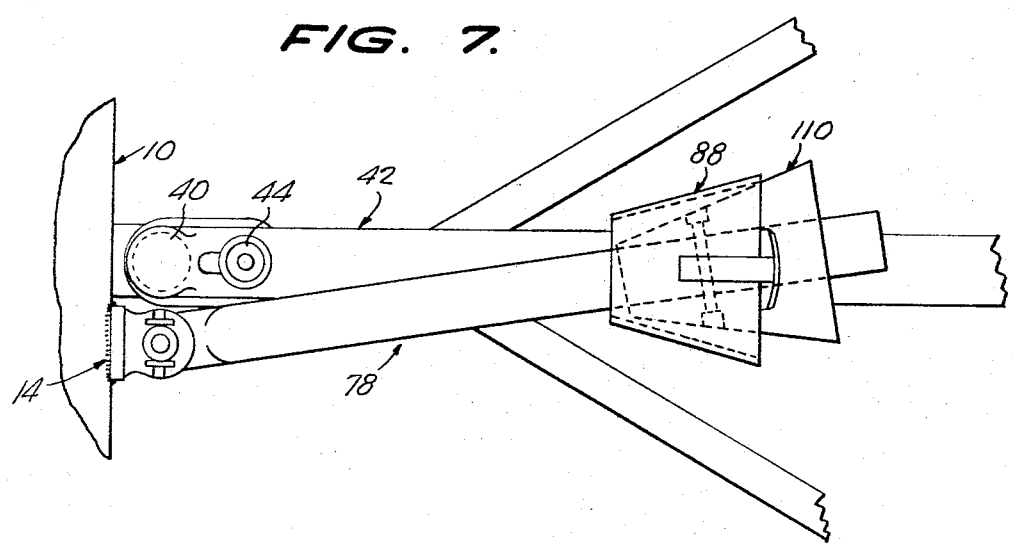
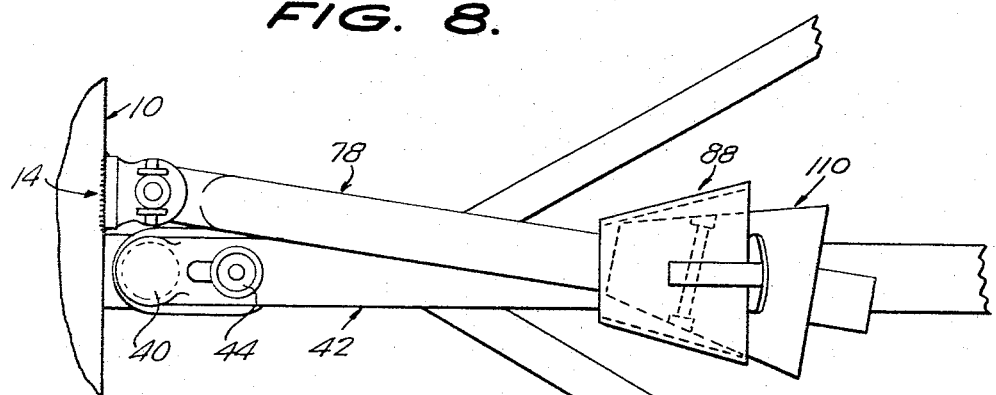
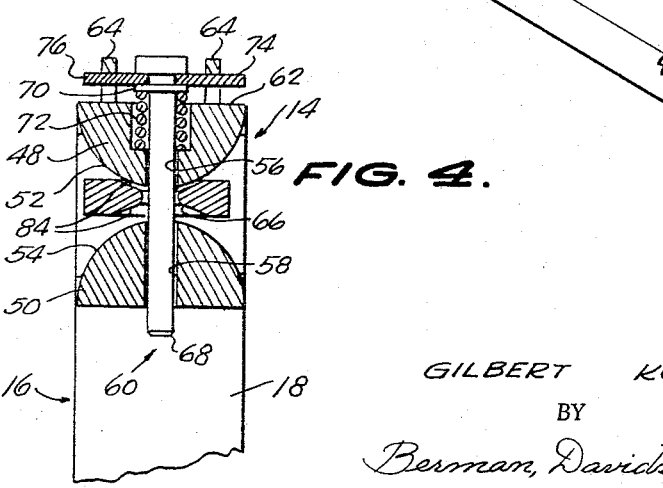

June 20, 1967  G. C. KOTHMANN  3,326,576
UNIVERSAL HITCH FOR EMERGENCY DRAWBAR
Filed Sept. 10, 1965  3 Sheets-Sheet 3
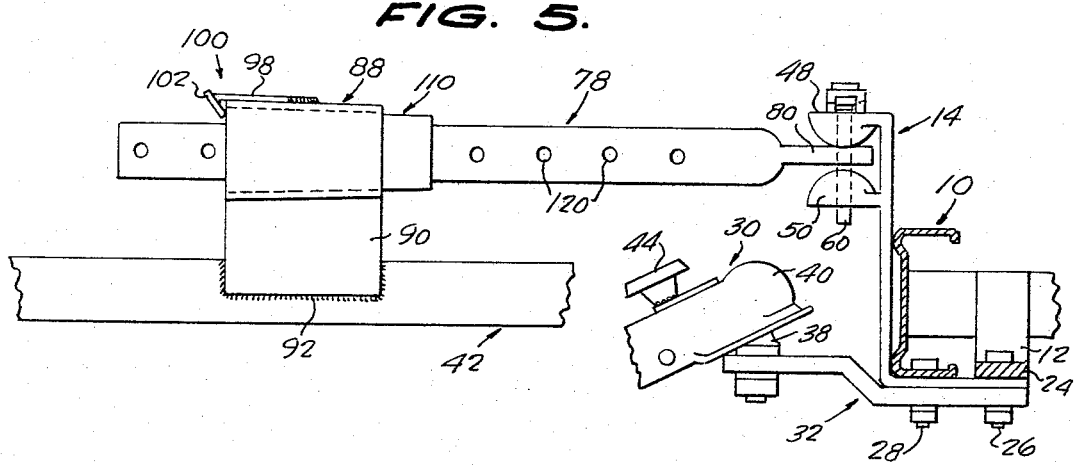
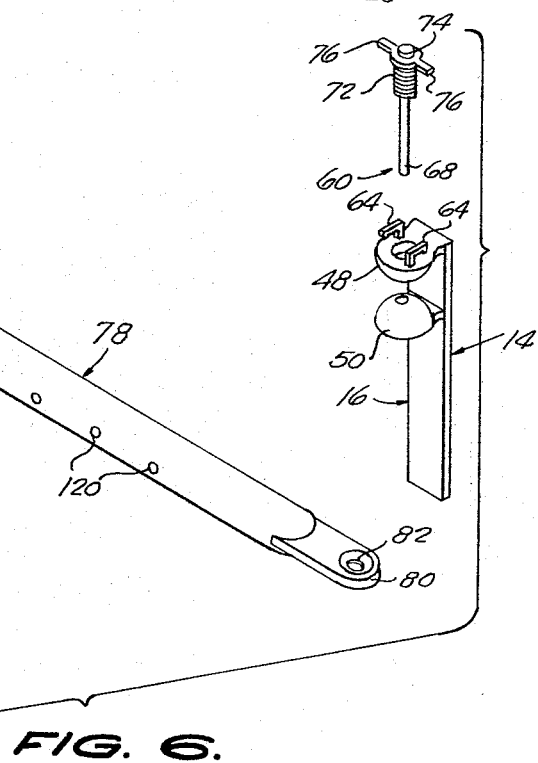
INVENTOR.
GILBERT KOTHMANN,
BY
Berman, Davidson + Berman
ATTORNEYS.

United States Patent Office 3,326,576
Patented June 20, 1967

3,326,576
UNIVERSAL HITCH FOR EMERGENCY
DRAWBAR
Gilbert C. Kothmann, Mason, Tex. 76856
Filed Sept. 10, 1965, Ser. No. 486,356
4 Claims. (Cl. 280—515)

This invention relates to a fail-safe hitch assembly for connection between tractor vehicles and trailer vehicles.

The primary object of the invention is the provision of a simple, reliable, and efficient assembly of the kind indicated, which can involve a primary substantially conventional trailer vehicle draw bar, with ball-and-socket connection between the primary draw bar and a tractor vehicle, and an auxiliary safety draw bar adapted to be unconnected to the trailer vehicle and having a swivel connection with the tractor vehicle, the auxiliary draw bar being adapted to be inactive to pull the trailer vehicle, while the primary draw bar and its connection to the tractor vehicle are intact, and adapted to become active to pull the trailer vehicle whenever the primary draw bar or its connection to the trailer vehicle fail.

Another object of the invention is the provision, in an assembly of the character indicated above, of a hitch mount adapted to be secured to a tractor vehicle, as to the rear bumper bar thereof, to which both the primary draw bar and the auxiliary draw bar are independently connected, whereby the normal freedom of action of the primary draw bar is unimpaired by the presence of the auxiliary draw bar, and a straight-ahead pull is exerted by the primary draw bar, the auxiliary draw bar connection to the hitch mount being arranged so that freedom of ready access to the securing means of the primary draw bar's ball-and-socket connection is retained, despite the presence of the auxiliary draw bar.

A further object of the invention is the provision, in an asembly of the character indicated above, of an auxiliary draw bar which is flexibly and supportably connected, intermediate its ends, to the primary draw bar, by means which permits the auxiliary draw bar to move upwardly and downwardly, relative to the primary draw bar, under normal conditions, the said means comprising a tapered sleeve fixed to the primary draw bar, and a tapered block mounted on and adjustable along the auxiliary draw bar and loosely engaged in the sleeve for lost lateral, vertical, and longitudinal movements, relative to the sleeve, in the inoperative condition of the auxiliary draw bar, the sleeve being provided with latch means which is adapted, upon disconnection of the primary draw bar, relative to the trailer vehicle, to latch behind the block and prevent separation of the tractor and trailer vehicles, as the block moves forward into the sleeve, as a result of such disconnection.

In the drawings:

FIGURE 1 is a fragmentary top plan view, showing an assembly of the present invention, the auxiliary draw bar being in inoperative condition;

FIGURE 2 is a side elevation of FIGURE 1, parts being broken away and in vertical section;

FIGURE 3 is an enlarged fragmentary horizontal section, taken on the line 3—3 of FIGURE 2;

FIGURE 4 is a further enlarged fragmentary vertical transverse section, taken on the line 4—4 of FIGURE 2;

FIGURE 5 is a side elevation of the assembly, parts being broken away and in vertical section, showing failure of the primary draw bar and a resultant operative condition of the auxiliary draw bar;

FIGURE 6 is an exploded perspective view of the components of the assembly, and

FIGURES 7 and 8 are plan views similar to FIGURE 1, illustrating alternative arrangements of the main and safety hitches.

Referring in detail to the drawings, a horizontal transverse tractor vehicle rear bumper bar 10 is shown, which includes a forwardly extending horizontal brace bar 12, a hitch mount 14 being secured to the bars 10 and 12.

The hitch mount 14 comprises an L-shaped bracket 16 having a vertically elongated flat standard 18, taller than the height of the bumper bar 10, with a horizontal, forwardly extending foot portion 20, on its lower end. The standard 18 engages the rear side of the bumper bar 10, and is adapted to be secured thereto, as indicated at 22, with the foot portion 20 engaged with the undersides of the bumper bar and a horizontal part 24 of the brace bar 12, and secured in place by means of bolts 26 and 28, respectively.

A generally conventional hitch 30 comprises a horizontal tongue 32 having a forward portion 34 fixed to the underside of the foot portion 20 of the bracket 16, by means of the bolts 26 and 28. The tongue 32 has an upwardly offset rear portion 36, extending rearwardly from the bracket 16 and having an upstanding hitch ball 38 fixed thereon. The hitch 30 further comprises a socket 40 on the forward end of a generally conventional trailer vehicle primary draw bar 42. An upstanding screw 44, associated with the socket 40 and the draw bar 42, is provided for retaining the socket engaged over the ball 38, in the usual way. As indicated in FIGURES 1, 7, and 8, the primary draw bar 42 can have rearwardly and outwardly angled braces 46 rigidly connected thereto for centering the draw bar on the longitudinal centerline of a trailer vehicle (not shown) to which the draw bar 42 and the braces 46 are adapted to be fixedly secured.

The hitch mount 14 further comprises vertically spaced and aligned upper and lower lugs 48 and 50, which are fixed to and extend rearwardly from the upper part of the standard 18, of the bracket 16. The lugs 48 and 50 are formed with facing convex surfaces 52 and 54, respectively, and with aligned vertical bores 56 and 58, respectively, extending therethrough and adapted to accommodate a vertical hitch pin 60. As shown in detail in FIGURE 4, the upper lug 48 has a flat surface 62, from which rise a pair of diametrically spaced parallel downturned retaining hooks 64, located at opposite sides of an enlarged diameter counterbore 66 formed in the top of the lug 48 and opening to the bore 56. The hitch pin 60 has a smooth shank 68, adapted to engage slidably and rotatably through the bores 56 and 58, having a washer 70 thereon, adjacent to its upper end, with a coil spring 72 engaged on the shank 68 and compressed between the washer 70 and the bottom of the counterbore 66, the washer 70 being engaged with the underside of an enlarged diameter slot in circular head 74 fixed on the upper part of the hitch pin shank 68. The head 74 is smaller in diameter than the space between the retaining hooks 64, and has diametrically opposed ears 76 projecting therefrom, the ears 76 being adapted to be retainably and releasably engaged against the resistence of the spring 72, under the hooks 64, for retaining the hitch pin 60 in place.

A horizontal auxiliary draw bar 78, preferably tubular in form, and which is normally spaced above and in line with the primary draw bar 42, has a flat horizontal tongue 80, on its forward end, which is thinner than the vertical distance between the opposed convex surfaces 52 and 54, of the hitch mount bracket lugs 48 and 50, respectively, is disposed between these lugs and is formed with a central hole 82, which receives the shank of the hitch pin 60. The upper and lower surfaces of the tongue 80 are formed with concave recesses 84, in which can conformably engage the convex surfaces of the related lugs 48 and 50. With this arrangement, the auxiliary draw bar 78 is flexibly connected to the tractor vehicle to swing relative thereto, in upward and downward and lateral directions, independently of the primary draw bar 42.

Permitting the flexible movements of the auxiliary draw bar 78, relative to the primary draw bar 42, while imposing defined limits thereto, and providing support of the auxiliary draw bar by the primary draw bar, is a latchable lost-motion assembly 86. The assembly 86 comprises a hollow, horizontally disposed, forwardly tapered sleeve 88, having parallel spaced pendant flanges 90 which are rigidly fixed, as indicated at 92, to opposite sides of the primary draw bar 42, at a location intermediate the ends of both draw bars. The sleeve 88 has a side wall 94 upon the top of which is fixed, as indicated at 96, the forward end of the rearwardly extending flat leaf spring 98 of a latch 100. On its rear end, the leaf spring 98 has a fixed detent plate 102 which is spaced rearwardly, relative to the rear end 104, of the sleeve 88. As shown in FIGURES 1, 2, and 5, the detent plate 102 extends to opposite sides of the leaf spring 98, is disposed at a forward and downward angle, relative to the auxiliary draw bar 78, and has a lower edge 106 which is positioned below the top of the sleeve side wall 94, for stop engagement with the flat rear end 108, of a substantially solid, forwardly tapered block 110.

The block 110, like the sleeve 88, is frustro-conical in form, but is longer than the sleeve 88, as shown in FIGURE 3. The block 110 is formed therethrough with an axial bore 112, which slidably receives the auxiliary draw bar 78, for adjustment therealong, and with a transverse bore 114, intermediate its ends. The transverse bore 114 accommodates a bolt 116, which is adapted to be selectively engaged through longitudinally spaced pairs of transversely aligned holes 120, provided in the side wall of the auxiliary draw bar 78, for holding the block 110 in a properly adjusted position, relative to the sleeve 88.

In operation, as shown in FIGURES 1, 2 and 3, while the connection of the primary draw bar 42 with the hitch mount 14 is intact, the block 110 is adjusted and secured in place, on the auxiliary draw bar 78, so that the block 110 extends rearwardly from the rear end of the sleeve 88, and is spaced from the side wall of the sleeve, with the lower edge of the detent plate 102 bearing upon the top of the exposed part of the block 110. Should the primary draw bar 42 or the hitch 30 break, or the primary draw bar become otherwise disconnected from the tractor vehicle, so that the tractor vehicle moves forwardly relative to the trailer vehicle, the block 110 is carried forwardly into and fits telescopically in the sleeve 88, so that the auxiliary draw bar 78 takes over the function of the primary draw bar 42, and prevents the trailer vehicle from becoming disconnected from the tractor vehicle. As the block 110 enters the sleeve 88, under these conditions, the latch leaf spring 98 biases the detent plate 102 against the auxiliary draw bar 78 and engages behind the rear end 108 of the block 110, so as to hold the block engaged in the sleeve.

In cases where, for any reason, the auxiliary draw bar 78 is not sufficiently spaced above the hitch 30 to afford free and convenient access to the hitch mount screw 44, the hitch mount 14 is adapted to be affixed to the tractor vehicle rear bumper bar 10, at a location to either side of the hitch 30, as shown in FIGURES 7 and 8. In these arrangements of the auxiliary draw bar 78, free access is provided to the hitch screw 44 and the hitch 30, for coupling and uncoupling the same.

What is claimed is:

1. A universal hitch for an emergency draw bar, said draw bar acting upon failure of the main draw bar hitch between a pulling and a trailing vehicle, said universal hitch comprising: a pair of opposed members oppositely curved; a draft member interposed between said opposed members, said draft member having an opening of generally toric interior configuration; and a pin penetrating both said opposed members and the opening of said draft member, said opposed pair of members being attached to one of said vehicles and said draft member to the other.

2. A hitch as set forth in claim 1, including resilient means for retaining said pin in active position.

3. A hitch as set forth in claim 1, in which said opposed members are substantially hemispherical with the convex surface of one confronting that of the other.

4. A hitch as set forth in claim 3, including resilient means for retaining said pin in active position.

References Cited

UNITED STATES PATENTS

| 2,053,255 | 9/1936 | Ferguson et al. | 280—457 |
| 2,251,656 | 8/1941 | Botelho | 280—457 |
| 2,650,101 | 8/1953 | Frankfother | 280—457 |
| 2,689,750 | 9/1954 | Van Horn | 280—457 |
| 2,772,918 | 12/1956 | Klinger | 280—511 X |
| 2,834,611 | 5/1958 | Chenette | 280—511 |

FOREIGN PATENTS 235,369  8/1960  Australia.

LEO FRIAGLIA, *Primary Examiner.*